May 27, 1924.  1,495,726
A. E. COOK ET AL
LAND AND WATER TRANSPORT
Filed July 29, 1920   3 Sheets-Sheet 1
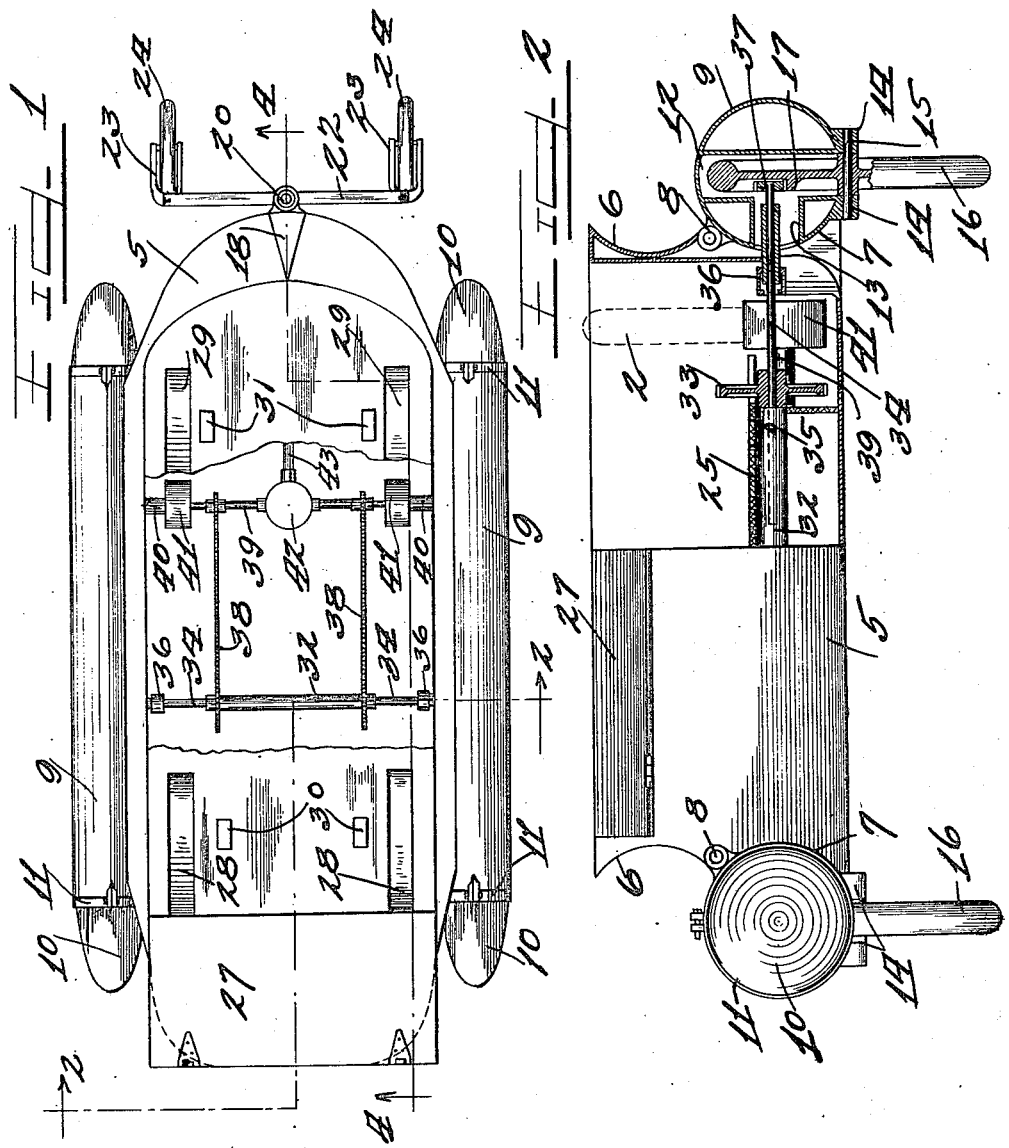
Inventor
Albert E Cook
Thomas Van Tuyl
by Charles W. Hills Atty

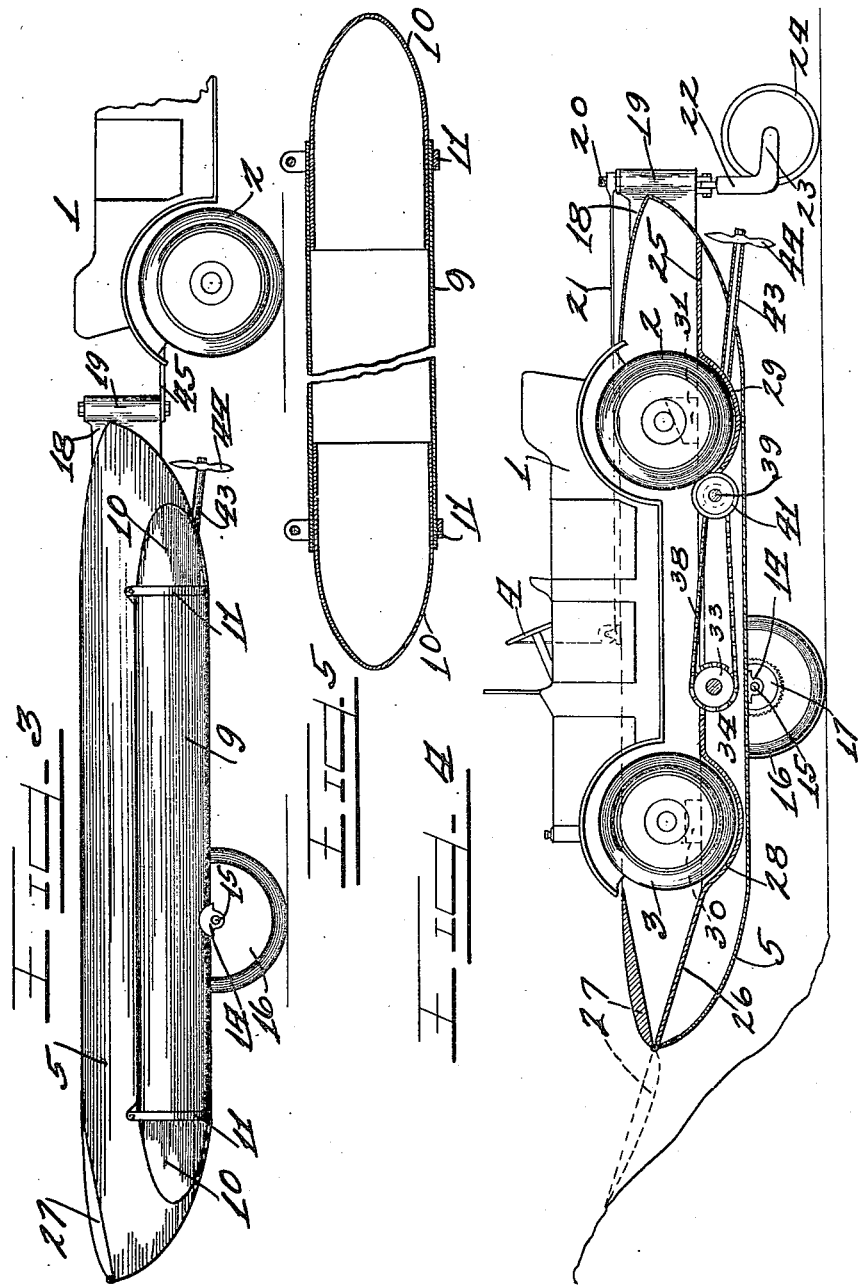

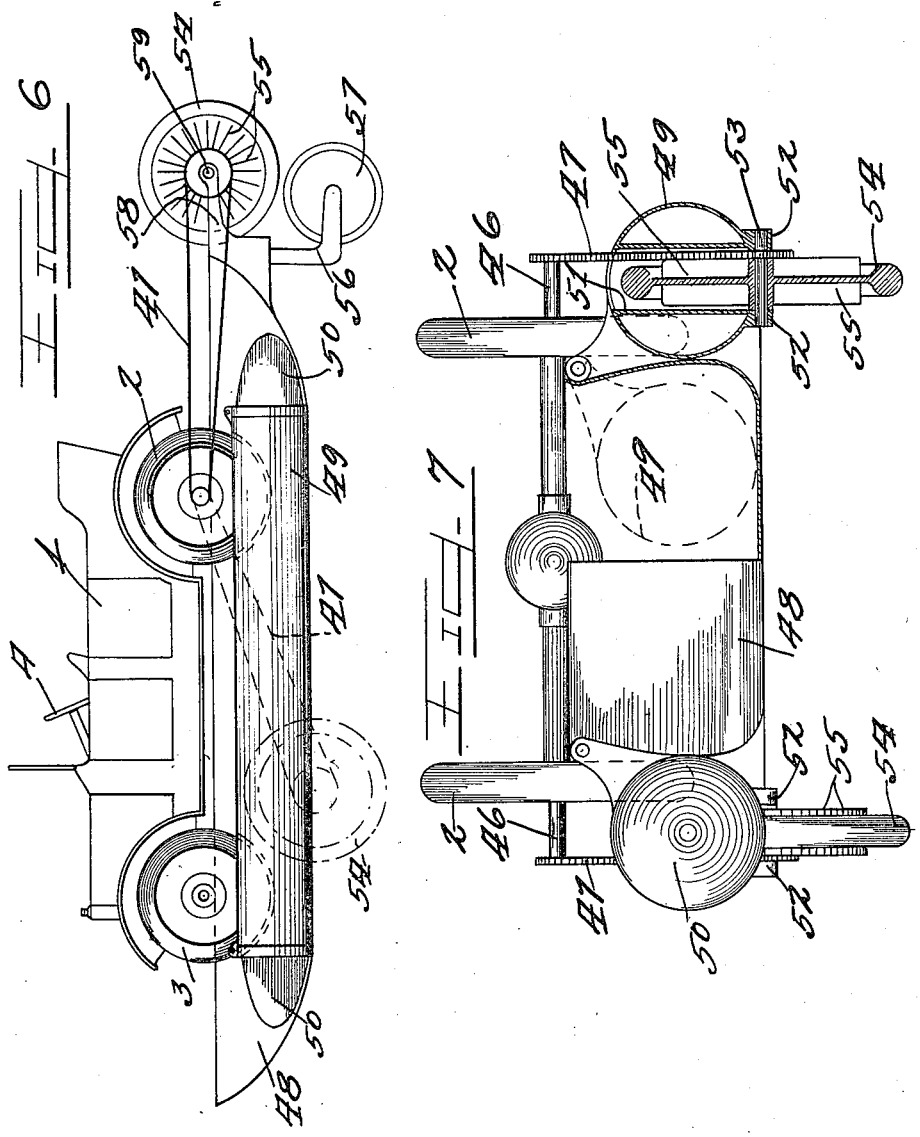

Patented May 27, 1924.

1,495,726

UNITED STATES PATENT OFFICE.

ALBERT EUGENE COOK, OF EVANSTON, AND THOMAS VAN TUYL, OF KANKAKEE, ILLINOIS; SAID VAN TUYL ASSIGNOR TO SAID COOK.

LAND AND WATER TRANSPORT.

Application filed July 29, 1920. Serial No. 399,822.

*To all whom it may concern:*

Be it known that we, ALBERT E. COOK and THOMAS VAN TUYL, citizens of the United States, and residents of the city of Evanston, in the county of Cook and State of Illinois, and the city of Kankakee, in the county of Kankakee and State of Illinois, respectively, have invented certain new and useful Improvements in a Land and Water Transport; and we do hereby declare that the following is a full, clear, and exact description of the same, reference being had to the accompanying drawings, and to the numerals of reference marked thereon, which form a part of this specification.

This invention relates more particularly to a land and water transportation truck adapted for use in combination with an automobile either on land or water and further adapted to be used as a trailer behind the automobile on land.

It is an object of this invention to provide a land and water truck adapted to have an automobile run thereon to operate the propelling mechanisms of the truck when the same is used on water.

It is also an object of the invention to provide a land and water vehicle the hull of which is provided with a propeller, connected with an operating mechanism adapted to be driven by the rear driving wheels of an automobile carried on the vehicle.

Another object of the invention is to construct a land and water vehicle having mechanisms for propelling the same on either land or water and adapted to be driven by the driving wheels or propelling mechanism of a power vehicle which has been run onto the vehicle into a position to co-act with said vehicle mechanisms.

It is a further object of this invention to provide a land and water craft wherein a hull is equipped with an automobile driven propeller and with adjustable side pontoons for stabilizing and varying the draft of the craft when the craft is used on water, said pontoons having driving wheels supported thereon and adapted to be driven by the automobile when the craft is used on land carrying the automobile thereon.

It is furthermore an object of this invention to construct a craft adapted to permit an automobile to be run thereon in position to permit the rear wheels of said automobile to contact and drive pulley wheels adapted to transmit a drive to a propeller supported by the craft hull or to wheels supported by adjustable telescoping pontoons mounted at the sides of the craft hull.

Another object of the invention is to provide a land and water vehicle adapted to carry an automobile thereon in position to permit the propelling mechanisms and the steering mechanisms of the vehicle to be operated from the automobile.

It is an important object of this invention to provide a land and water craft, adapted to be used on water to carry an automobile and be driven thereby, while on land said craft is adapted to be used as a trailer connected to be pulled by the automobile.

A further important object of this invention is to provide a land and water craft wherein a two-wheel steering device is provided for guiding the craft.

Other and further important objects of this invention will be apparent from the disclosures in the specification and drawings.

The invention (in a preferred form) is illustrated in the drawings and hereinafter more fully described.

On the drawings:

Figure 1 is a top plan view of the land and water transport embodying the principles of this invention.

Figure 2 is a sectional view taken on line 2—2, of Figure 1.

Figure 3 is a side elevation of the device when used as a trailer.

Figure 4 is a sectional view with parts in elevation taken on line 4—4, of Figure 1, showing the device used as a transport and driven by an automobile carried thereon.

Figure 5 is a longitudinal section taken through one of the telescoping pontoons of the device.

Figure 6 is a side elevation of a modified form of the device showing the pontoon wheels mounted on the rear of the device in position to be operated by the automobile for propelling the device, and showing the normal position of the pontoon wheels in dotted lines.

Figure 7 is a front elevation thereof partly shown in section with the pontoon wheels in normal position.

As shown on the drawings:

The land and water transport or craft is adapted for use in combination with an automobile 1, having rear driving wheels 2, front wheels 3, and a steering wheel 4.

In the form of the land and water craft shown in Figures 1 to 5 inclusive, the reference numeral 5, indicates a body or hull the sides of which are provided with curved longitudinal upper and lower pockets or grooves 6 and 7, respectively. Adjustably connected to the sides of the hull 5, by hinges 8, are side pontoons 9, provided with telescoping ends 10, which are adapted to be clamped in adjusted positions by clamping rings 11, or other suitable means.

Each side pontoon 9, is provided with chambers 12 and 13, communicating with each other as shown in Figure 2, and disposed at right angles. Bearings or supports 14, are provided on each pontoon for holding a removable wheel shaft or pin 15 in place. Journalled on each shaft 15, is a pontoon wheel 16, which projects into the respective pontoon chamber 12. A gear 17, is formed on the inner side of each of the pontoon wheels 16.

Rigidly secured at the stern of the hull 5, is a bracket 18, provided with a vertical sleeve 19, through which a rotatable steering stem or rod 20 projects. The upper end of the steering stem 20 may be provided with a cross bar or any ordinary steering mechanism to which is connected the cables 21, which are conducted over suitable pulleys into the automobile to be operated from the steering wheel position of the automobile. Connected to the lower end of the steering stem 20, is a yoke frame 22, each end of which is provided with an integral two-arm fork 23, adapted to rotatably support a steering wheel 24. A two-wheel steering mechanism is thus provided for steering the hull either on land or water.

The driving mechanisms for the craft are mounted in the hull 5, below a deck or floor 25, which is spaced above the bottom of the hull. The floor 25, at the front or bow end of the hull is inclined as at 26, and is adapted to afford a runway with a door or dashboard 27, which is hingedly connected to normally close the upper front portion of the hull. The floor 25, near the front end of the hull is provided with two front wheel pockets or recesses 28, while the rear portion of said floor is provided with two rear wheel pockets or recesses 29. Secured upon the floor 25, to the inside of the front wheel pockets 28, are two front blocks 30. Also fastened to the floor 25, to the inside of the rear wheel pockets 29, are two rear blocks 31.

Disposed transversely of the hull 5, below the floor 25, is a rotatable front driving axle or shaft 32, having a sprocket wheel 33, formed near each end thereof. The front shaft 32, is supported by end or auxiliary shafts 34, which project axially into the ends of the front shaft 32, and are secured thereto by removable retaining pins 35. The end shafts 34, are journalled in bearings 36, and project through the sides of the hull. Each of the end shafts 34, has a pinion 37, secured on the outer end thereof to mesh with the pontoon wheel gear 17, when the pontoons are in their lower positions as shown in Figure 2. Trained around the sprocket gears 33, are endless chains 38, which run longitudinally of the hull and are engaged around rear sprocket gears, which are secured on a rear shaft 39. The rear shaft 39, is supported in bearings 40. Keyed or otherwise secured on the rear shaft 39, to the inside of the bearings 40, and in the planes of the rear pockets 29, are two friction drums or pulley wheels 41. A differential 42, is connected in the rear shaft 39, for transmitting a drive to an inclined propeller shaft 43, which extends rearwardly through the stern of the hull 5. A propeller 44, is secured on the projecting end of the propeller shaft 43.

When the craft is used as a trailer, as shown in Figure 3, the steering wheel mechanism is removed, and a draw bar 45, is used to connect the stern end of the craft to the rear end of the automobile.

The modified form of land and water craft shown in Figures 6 and 7, is also adapted to be used in combination with an automobile 1, the rear shaft or axle of which is provided with shaft extensions 46, on the outer ends of which sprocket gears are secured. Driving chains 47, are trained around the sprocket gears of the shaft extensions 46.

The modified form of land and water craft embraces a body or hull 48, having hingedly connected to the sides thereof longitudinal pontoons 49, provided with telescoping ends 50, to permit the length of said pontoons to be increased or decreased. Each pontoon is provided with a wheel chamber 51, and bearings 52. A wheel axle or shaft 53, is journaled in the bearings 52, of each pontoon. Keyed on each wheel shaft 53, is a pontoon wheel 54, and a sprocket gear around which the chain 47, is trained. Each of the pontoon wheels 54, is provided with radial paddles or vanes 55.

Mounted centrally at the stern of the hull 48, is a steering bracket or arm 56, on which a steering wheel 57, is rotatably supported. The bracket 56 is adapted to be operated by means of ropes attached to the ends of a cross-piece or bar fixed on the upper end of the bracket 56 in the usual manner. Also rigidly secured at each side of the stern end of the hull 48, is an arm 58. The arms 58, afford a support for a rear transverse shaft 59, on which the pontoon wheels 54, are removably mounted when said wheels are to be used as propellers as shown in Figure 6.

In this form of the craft the automobile 1, is adapted to be positioned on the hull 48, with the front and rear axle sleeves of the automobile resting on the sides of the hull, and with the automobile wheels 2 and 3, disposed to the outside of the hull side walls. The pontoons are provided with suitable pockets or recesses to receive the automobile wheels.

When the device is used as a water craft the pontoon wheels are removed from the pontoons and mounted on the propeller shaft 59. The pontoons may be positioned within the hull 48, as shown in dotted lines in Figure 7, when the device is used on land.

The operation is as follows:

The device may be used as a trailer on land and as a transport on water. When used as a water craft, as shown in Figure 4, the automobile 1, is positioned in the hull 5, with the automobile front axle sleeve resting on the front blocks 30, and the automobile rear axle sleeves resting on the rear blocks 31. In this position the front and rear automobile wheels 3 and 2 respectively are raised out of contact with the hull floor 25, and are free to rotate in the floor pockets 28 and 29, respectively. The automobile rear wheels 2, however, are positioned to frictionally contact the friction pulleys 41. After the automobile has been backed into the hull over the open door 27, and the inclined floor board 26, the door 27, is closed.

When the automobile engine is started the rear wheels 2, thereof are driven, thereby causing the pulley wheels 41, to rotate and thereby operate the driving shaft 39, and the differential 42. A drive from the automobile is thus transmitted to the propeller shaft 43, and the propeller 44, secured thereto. The propeller acts to drive the craft on the water. Rotation of the friction wheels 41, also serves to rotate the front hull shaft 32, through the chains 38. Since the craft is propelled by the propeller 44, the shaft pins 35, are removed from engagement with the shaft 32 and the end shafts 34, and no drive is therefore transmitted to the pontoon wheels 16. When in the water the craft is steered from the hand wheel position of the automobile by means of the cables 21, which being connected to a cross bar on the steering stem 20 permit steering of the two wheel steering devices 22—24.

If the weather is fair and the water is comparatively smooth, the craft may be run at a high rate of speed or with light draft by securing the side pontoons 9, in their lower positions seated within the hull grooves 7, and thereby affording a broad flotation surface, so that the craft is still exceedingly stable. Should the weather be stormy and the water rough, the stability of the craft is increased by swinging the pontoons 9, into their upper positions within the hull grooves 6. The draft of the craft is thereby increased and the pitching and rolling of the craft is reduced. As shown in Figure 5, the pontoons 9, are provided with ends 10, which telescope into the pontoons. The length of the pontoons may be varied by adjusting the pontoon ends 10.

When the craft is run on the land, to be used as a truck, the pins 35, are again secured in place to connect the end shaft 34, to the rotatable shaft section 32. A drive from the automobile 1, is now transmitted to the pontoon wheels 16, through the end shafts 34 and the pinions 37 which are in mesh with the pontoon wheel gears 17. On land the device is also steered by the two wheel steering mechanism.

The device may be used as a trailer on land as shown in Figure 3. In this case the steering mechanism 22—24, is simply removed and the stern end of the craft is connected to the rear end of the automobile 1, by the drawbar 45. The pontoon wheels 16, support the craft and permit the same to be drawn over the ground.

In the modified form of the device shown in Figures 6 and 7, the device may be used as a water craft by running the automobile onto the hull 48, with the wheels 2 and 3, disposed to the outside of the hull side walls. The pontoon wheels 54, are removed from the pontoons and mounted on the shaft 59, to be driven by means of the chains 47, from the shaft extensions 46, connected to the automobile rear axle. The pontoon wheels 54, are provided with radial propeller blades 55, to permit the wheels 54, to be used as propellers for driving the craft on water. On land the pontoon wheels 54, are supported by the pontoons as shown in Figure 7, and in dotted lines in Figure 6. The craft is steered by means of the steering wheel 57, which may be operated by any ordinary means on both land and water.

We are aware that numerous details of construction may be varied through a wide range without departing from the principles of this invention, and we therefore do not purpose limiting the patent granted otherwise than necessitated by the prior art.

We claim as our invention:

1. A land and water craft comprising a hull, a driving mechanism therein, a propeller shaft connected therewith and projecting outwardly through the stern of said hull, a propeller on the outer end of said shaft adapted to be driven by said driving mechanism to propel the craft when in the water, pontoons adjustably connected to said hull, driving wheels supported thereon for supporting the craft when on land, and means connecting said driving wheels with the driving mechanism in said hull to permit a drive to be transmitted to said wheels for driving the craft when on land.

2. A land and water vehicle embracing a hull, a driving mechanism therein, a propeller shaft connected therewith and projecting through the stern of said hull, a propeller on the outer end of said shaft adapted to be driven by said driving mechanism to propel the vehicle when in the water, a two-wheel steering mechanism on said hull for steering the vehicle on land and in the water, pontoons connected to the sides of said hull, driving wheels carried by said pontoons for supporting the vehicle when on land, and means connected with said driving mechanism and with said driving wheels to permit a drive to be transmitted to said wheels from the driving mechanism for driving the vehicle when on land.

3. A land and water transport comprising a hull, a steering mechanism at one end thereof for supporting the stern end of the hull when on land and acting as a rudder when the transport is used in the water, a floor in said hull, blocks mounted thereon and adapted to support an automobile with the wheels thereof free to rotate, a mechanism in said hull, friction wheels forming a part thereof adapted to be driven by the rear wheels of the automobile, a propeller connected with said mechanism for propelling the transport when in the water, pontoons adjustably mounted on the sides of said hull for varying the draft of the transport, means for changing the length of said pontoons, driving wheels on said pontoons connected to receive a drive from said mechanism for driving the transport when used on the land, and means for disconnecting the drive to said driving wheels.

4. A land and water craft comprising a hull, a floor therein having wheel pockets therein, blocks on said floor, a door at one end of the hull adapted when open to permit an automobile to be backed into said hull with the automobile axles resting on said blocks and the automobile wheels freely engaged in said pockets, a shaft journalled transversely in said hull, pulley wheels secured thereon to be frictionally driven by the rear wheels of the automobile, a differential in said shaft, a propeller shaft connected therewith, a propeller secured on the projecting end of said propeller shaft, sprocket gears on said transverse shaft, a second transverse shaft mounted in said hull, sprocket gears thereon, chains trained around the sprocket gears of said transverse shafts, pinions on the ends of said second transverse shaft, chambered pontoons hingedly connected to the sides of said hull adapted to receive the ends of said second transverse shaft and the pinions mounted thereon, wheels journalled in said pontoons, and gears formed thereon adapted to mesh with said pinions to receive a drive therefrom.

In testimony whereof, we have hereunto subscribed our names in the presence of two subscribing witnesses.

ALBERT EUGENE COOK.
THOMAS VAN TUYL.

Witnesses:
  EARL M. HARDINE,
  CARLTON HILL.